United States Patent
Zhu et al.

(10) Patent No.: US 8,457,231 B2
(45) Date of Patent: Jun. 4, 2013

(54) QUASI-ORTHOGONAL SPACE-TIME BLOCK ENCODER, DECODER AND METHODS FOR SPACE-TIME ENCODING AND DECODING ORTHOGONAL FREQUENCY DIVISION MULTIPLEXED SIGNALS IN A MULTIPLE-INPUT MULTIPLE-OUTPUT SYSTEM

(75) Inventors: Wenwu Zhu, Beijing (CN); May Wu, Shanghai (CN); Xiang-Gen Xia, Newark, DE (US)

(73) Assignee: Intel Corporation, Santa Clara, CA (US)

( * ) Notice: Subject to any disclaimer, the term of this patent is extended or adjusted under 35 U.S.C. 154(b) by 866 days.

(21) Appl. No.: 12/447,026

(22) PCT Filed: Oct. 24, 2006

(86) PCT No.: PCT/CN2006/002832
§ 371 (c)(1),
(2), (4) Date: Nov. 20, 2009

(87) PCT Pub. No.: WO2008/049267
PCT Pub. Date: May 2, 2008

(65) Prior Publication Data
US 2010/0086080 A1    Apr. 8, 2010

(51) Int. Cl.
H04L 1/02 (2006.01)
H04L 27/28 (2006.01)

(52) U.S. Cl.
USPC .......................................... 375/267; 375/260

(58) Field of Classification Search
USPC ........... 375/267, 260, 295, 298, 341; 370/345
See application file for complete search history.

(56) References Cited

U.S. PATENT DOCUMENTS

| | | | |
|---|---|---|---|
| 2006/0227909 A1* | 10/2006 | Thomas et al. | 375/346 |
| 2007/0098092 A1* | 5/2007 | Mitran | 375/260 |
| 2009/0080566 A1* | 3/2009 | Tong et al. | 375/299 |
| 2011/0255572 A1* | 10/2011 | Giannakis et al. | 375/146 |

FOREIGN PATENT DOCUMENTS

| | | |
|---|---|---|
| CN | 1787507 | 12/2004 |
| CN | 1623293 A | 6/2005 |
| CN | 1668035 | 9/2005 |
| KR | 1077749 A | 10/2011 |
| WO | WO-2006002550 A1 | 1/2006 |
| WO | WO-2006039185 A1 | 4/2006 |
| WO | WO-2006096880 A2 | 9/2006 |
| WO | WO-2008049267 A1 | 5/2009 |

OTHER PUBLICATIONS

Alamouti, Siavash M., "A Simple Transmit Diversity Technique for Wireless Communications", *IEEE Journal on Select Areas in Communications*, 16(8), (Oct. 1998), 1451-1458.

(Continued)

*Primary Examiner* — Khai Tran
(74) *Attorney, Agent, or Firm* — Schwegman, Lundberg & Woessner, P.A.; Gregory J. Gorrie (57) ABSTRACT

Embodiments of quasi-orthogonal space-time encoder, decoder and method for space-time encoding and decoding orthogonal frequency division multiplexed (OFDM) signals in a multiple-input multiple-output (MDMO) system are generally described herein. Other embodiments may be described and claimed. In some embodiments, a method of decoding received multicarrier signals comprises deriving objective functions from a received signal matrix, minimizing the objective functions to generate decoded hard bits, and solving a set of linear equations of the objective functions to generate decoded soft bits.

13 Claims, 4 Drawing Sheets

MULTICARRIER TRANSMITTER

OTHER PUBLICATIONS

Tarokh, Vahid, et al., "Space-Time Codes for High Data Rate Wireless Communication: Performance Criterion and Code Construction", *IEEE Transactions on Information Theory*, 44(2), (Mar. 1998), 744-765.

Wang, Haiquan, et al., "On Optimal Quasi-Orthogonal Space-Time Block Codes with Minimum Decoding Complexity" *Proc. ISIT 2005*, (2005).

"Korean Application Serial No. 10-2009-7008325, Office Action mailed Nov. 27, 2010", 5 Pgs.

"Chinese Application Serial No. 200680056175.8, Office Action mailed Jan. 31, 2012", 15 pgs.

"Chinese Application Serial No. 200680056175.8, Office Action mailed Jul. 20, 2012", 10 pgs.

"Chinese Application Serial No. 200680056175.8, Office Action mailed Jul. 2, 2012", 15 pgs.

"Chinese Application Serial No. 200680056175.8, Response filed May 9, 2011 to Non Final Office Action dated May 9, 2011", 11 pgs.

"Japanese Application Serial No. 2009-532666, Office Action mailed Sep. 27, 2011", 6 pgs.

Hottinen, Ari, et al., "Multi-antenna Transceiver Techniques for 3G and Beyond", (Mar. 28, 2003), 178-186.

Medles, A, et al., "Linear Precoding for STBC to Account for Antenna Correlation in Next Generation Broadband Systems", 2005 IEEE 16th International Symposium on Personal, Indoor and Mobile Radio Communications, vol. 2, (Sep. 14, 2005), 1145-1149.

\* cited by examiner

QUASI-ORTHOGONAL SPACE-TIME BLOCK ENCODER, DECODER AND METHODS FOR SPACE-TIME ENCODING AND DECODING ORTHOGONAL FREQUENCY DIVISION MULTIPLEXED SIGNALS IN A MULTIPLE-INPUT MULTIPLE-OUTPUT SYSTEM

This application is a U.S. National Stage Filing under 35 U.S.C. 371 from International Application No. PCT/CN2006/002832, filed Oct. 24, 2006 and published in English as WO 2008/049267 on May 2, 2008, which application and publication are incorporated herein by reference in their entireties.

TECHNICAL FIELD

The present invention pertains to wireless communication systems. Some embodiments relate to the transmission and reception of multicarrier signals using a plurality of antennas. Some embodiments pertain to multiple-input, multiple-output (MEMO) orthogonal frequency division multiplexed (OFDM) systems.

BACKGROUND

Some wireless communication systems employ multiple transmit antennas and/or multiple receive antennas to increase the amount of data that may be transmitted. In some MIMO systems that employ multicarrier signals, such as OFDM, each transmit antenna may be configured to transmit a separately encoded information stream on the same set of subcarriers. Decoding the individual subcarriers at the receiver becomes increasingly difficult when more than two transmit antennas are used, especially for higher coding rates.

Thus, there are general needs for encoders, decoders, and methods for encoding and decoding in multicarrier systems with reduced complexity.

DETAILED DESCRIPTION

The following description and the drawings sufficiently illustrate specific embodiments of the invention to enable those skilled in the art to practice them. Other embodiments may incorporate structural, logical, electrical, process, and other changes. Portions and features of some embodiments may be included in, or substituted for, those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
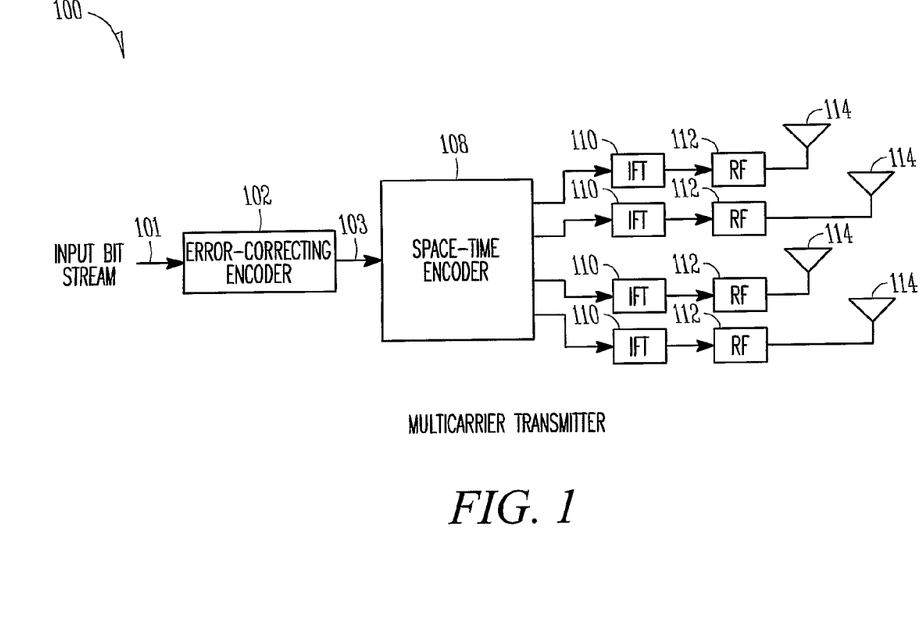
FIG. 1 is a functional block diagram of a multicarrier transmitter in accordance with some embodiments of the present invention.

FIG. 1 is a functional block diagram of a multicarrier transmitter in accordance with some embodiments of the present invention. Multicarrier transmitter 100 transmits multicarrier signals generated from input bit stream 101 using a plurality of transmit antennas 114. In some embodiments, multicarrier transmitter 100 may be part of a multiple-input, multiple-output (MIMO) communication system and each of transmit antennas 114 may transmit different information symbols. Multicarrier transmitter 100 may include error-correcting encoder 102 to encode input bit stream 101, space-time encoder 108 to generate constellation symbols from encoded bit stream 103 and provide the space-time encoded constellation symbols to inverse Fourier transform (IFT) circuitry 110. The constellation symbols may be viewed as frequency-domain symbols. IFT circuitry 110 may perform an inverse discrete Fourier transform to convert blocks of these frequency-domain signals to the time-domain. Each of these converted blocks may be referred to as a multicarrier symbol or an OFDM symbol.

Multicarrier transmitter 100 may also include radio-frequency (RF) circuitry 112 for generating RF signals from digital time-domain baseband signals provided by IFT circuitry 110 for transmission by a corresponding one of transmit antennas 114. Multicarrier transmitter 100 may also include other functional elements not illustrated in FIG. 1 for ease of understanding.

In accordance with some embodiments, space-time encoder 108 space-time encodes multicarrier signals by generating a constellation set from initial bit stream 103 and maps the bits of the constellation set to form a plurality of complex symbols corresponding to the number of transmit antennas 114. Space-time encoder 108 may also linearly transform the symbols of the constellation set with a selected linear transformation matrix to generate linearly transformed symbols. Space-time encoder 108 may also form complex symbols corresponding to the number of transmit antennas 114 from the linearly transformed symbols. Space-time encoder 108 may also form code matrices, such as Alamouti code matrices, from the complex symbols and may generate a quasi-orthogonal space-time matrix from the code matrices for use in generating multicarrier signals for transmission by transmit antennas 114. These embodiments are discussed in more detail below.

In some embodiments, a sequence of symbols represented by one dimension (e.g., a row) of the quasi-orthogonal space-time matrix may be further processed for subsequent transmission on a plurality of subcarriers that comprise the multicarrier signals by transmit antennas 114. These embodiments are also discussed in more detail below.

In some embodiments, for each transmit antenna 114, an inverse Fourier transform may be performed by IFT circuitry 110 on each of the symbols in one dimension (e.g., a row) of the quasi-orthogonal space-time matrix to generate a time-domain waveform. For each transmit antenna 114, the time-domain waveform may be upconverted by RF circuitry 112 for transmission by an associated one of transmit antennas 114. Each transmit antenna 114 may concurrently transmit information represented by groups of the symbols of one dimension (e.g., a row) of the quasi-orthogonal space-time matrix. These embodiments are also discussed in more detail below.

In some embodiments, the code matrices generated from the linearly transformed symbols may comprise Alamouti code matrices and the quasi-orthogonal space-time matrix may comprise a matrix of the Alamouti code matrices. In some embodiments, the constellation set may comprise a quadrature amplitude modulation (QAM) constellation set generated from bit stream 103. These embodiments are also discussed in more detail below.

Although some embodiments of the present invention are described using four transmit antennas 114, the scope of the invention is not limited in this respect as other numbers of transmit antennas may also be used. Transmit antennas 114 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, instead of two or more antennas, a single antenna with multiple apertures may be used. In these embodiments, each aperture may be considered a separate antenna. In some embodiments, each antenna may be effectively separated to take advantage of spatial diversity and the different channel characteristics that may result between each of transmit antennas 114 and another wireless communication device. In some embodiments, transmit antennas 114 may be separated by up to 1/10 of a wavelength or more.

Figure 2:
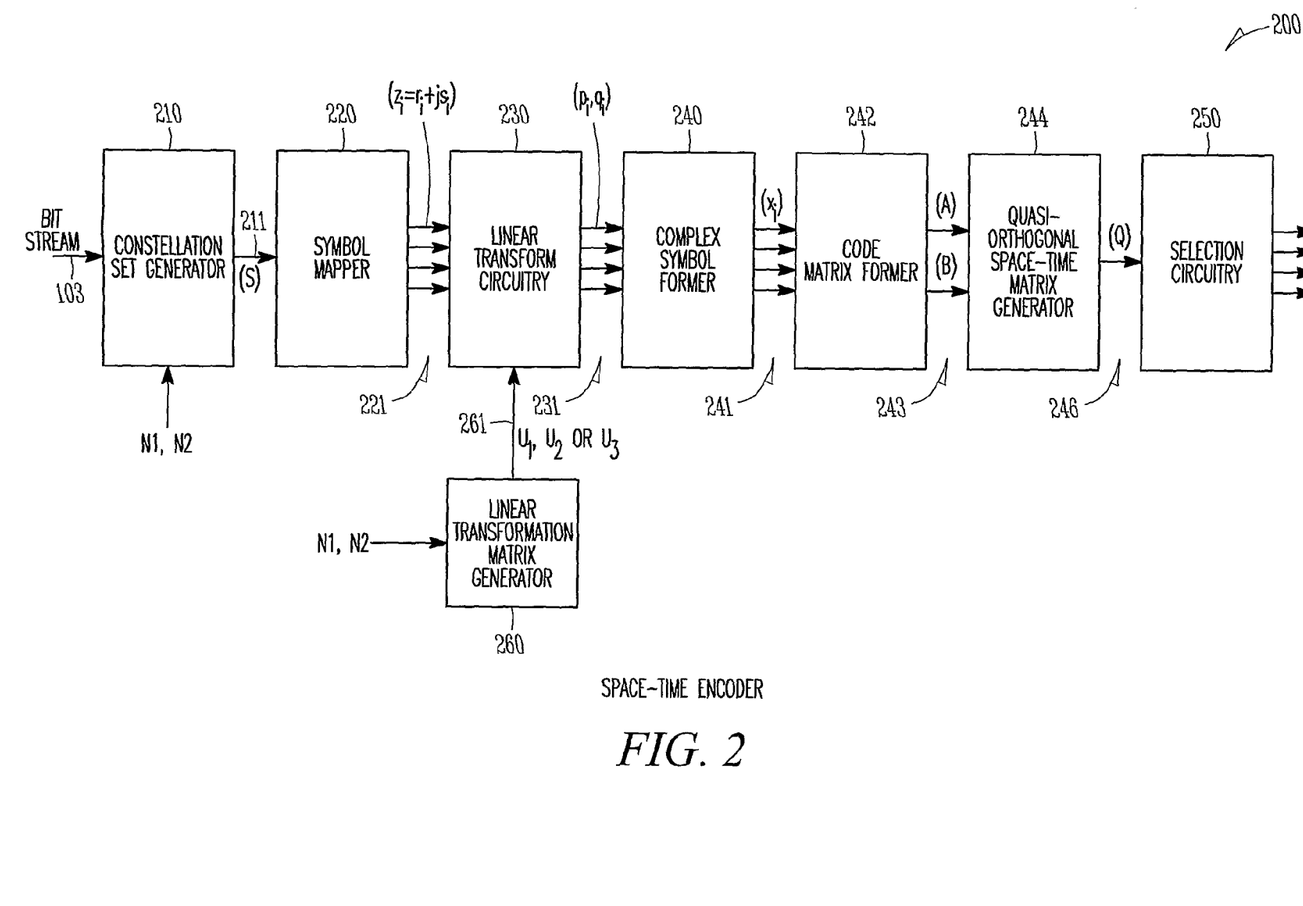
FIG. 2 is a functional diagram of a space-time encoder in accordance with some embodiments of the present invention.

FIG. 2 is a functional diagram of a space-time encoder in accordance with some embodiments of the present invention. Space-time encoder 200 may be suitable for use as space-time encoder 108 (FIG. 1), although other space-time encoder configurations may also be suitable.

In these embodiments, space-time encoder 200 comprises constellation set generator 210 to generate constellation set (S) 211 from bit stream 103 and symbol mapper 220 to map bits of constellation set 211 to a plurality of complex symbols ($z_i$) 221. Complex symbols $z_i$ may be represented as $r_i+js_i$. The number of complex symbols 221 may correspond to the number of transmit antennas, such as transmit antennas 114 (FIG. 1). In these embodiments, space-time encoder 200 also comprises linear transform circuitry 230 to linearly transform complex symbols 221 with selected transformation matrix 261 (e.g., either $U_1$, $U_2$ or $U_3$) to generate linearly transformed symbols ($p_i$, $q_i$) 231. Space-time encoder 200 may also include complex symbol former 240 to form complex symbols 241 for each of the transmit antennas from linearly transformed symbols 231. In these embodiments, space-time encoder 200 also comprises code matrix former 242 to form code matrices (A, B) 243 from complex symbols 241, and quasi-orthogonal space-time matrix generator 244 to generate quasi-orthogonal space-time matrix (Q) 246 from code matrices 243 for use in generating multicarrier signals for transmission on the transmit antennas.

In some embodiments, space-time encoder 200 may also comprise selection circuitry 250 to select the sequence of symbols represented by one dimension (e.g., a row) of quasi-orthogonal space-time matrix 246 for further processing and subsequent transmission by the transmit antennas. Each transmit antenna may concurrently transmit information represented by groups of the symbols of a dimension (e.g., a row) of the quasi-orthogonal space-time matrix 246.

In some embodiments, when four transmit antennas are used, each transmit antenna may transmit OFDM signals on a plurality of subcarriers. In some embodiments, the number of subcarriers may be 52, but may range from as few as ten to over a hundred or more. Each OFDM symbol includes a plurality of subcarriers. In some embodiments with four transmit antennas, four OFDM symbols may be encoded together by space-time encoder 200 and may be decoded together by a multicarrier receiver, such as multicarrier receiver 300 (FIG. 3), for each subcarrier using optimally transformed four-by-four quasi-orthogonal space-time block codes of rate 1 (i.e., 4 independent information symbols, one per antenna). In these embodiments, one information symbol is transmitted concurrently by each transmit antenna.

In these embodiments, constellation set generator 210 may generate constellation set 211 from bit stream 103. In these embodiments, constellation set 211 may represent a QAM signal constellation having a total of N1 by N2 points Constellation set 211 may be represented as follows:

$$S = \left\{ \frac{n_1 d}{2} + j\frac{n_2 d}{2} \middle| n_i \in \left\{ \begin{array}{l} -(2N_i-1), -(2N_i-3), \ldots, \\ -1, 1, \ldots, 2N_i-3, 2N_i-1 \end{array} \right\}, i=1,2 \right\},$$

In this equation, d represents a distance of closed points in each direction and may be determined based on a mean transmission power that is used by multicarrier transmitter 100 (FIG. 1). N1 and N2 may comprise positive integers such as 2, 4, 8, etc. and may depend on the modulation level (i.e., the number of bits per symbol) and/or the transmission rate.

In some embodiments that use four transmit antennas, symbol mapper 220 may map binary information bits to four complex symbols ($z_i$) in the constellation set S. In these embodiments, $z_i \in S$, $i=1, 2, 3, 4$. where $z_i = r_i + js_i$.

In these equations, $r_i$ and $s_i$ represent the real and imaginary parts of complex symbols $z_i$. In the case of four transmit antennas, the index i ranges from 1 to 4, which corresponds to the number of transmit antennas.

As described below, these information symbols (i.e., $r_i$ and $s_i$) are subsequently encoded within a four-by-four quasi-orthogonal space-time block code matrix in which one dimension (e.g., a row) is mapped to each of the four transmit antennas. The other dimension (i.e., a column) may represent the symbols in the frequency domain.

In these embodiments with four transmit antennas, linear transform circuitry 230 may linearly transform the eight real symbols generated by symbol mapper 220 (i.e., $r_i$ and $s_i$ for i=1, 2, 3, 4) into another eight real symbols (i.e., $p_i$ and $q_i$ for i=1, 2, 3, 4) by applying linear transformation matrix 261, which may be a four-by-four real matrix discussed in more detail below. An example of the linear transformation performed by linear transform circuitry 230 is illustrated by the following equations:

$(p_1, q_1, p_3, q_3)^T = U(r_1, s_1, r_3, s_3)^T$ $(p_2, q_2, p_4, q_4)^T = U(r_2, s_2, r_4, s_4)^T$

In these equations, T stands for the transpose operation and U represents the selected linear transformation matrix 261. The generation of linear transformation matrix 261 is discussed below.

In some embodiments, when four transmit antennas are used, complex symbol former 240 may form another set of four complex symbols 241 that may be represented as follows:

$x_i = p_i + jq_i$ for i=1, 2, 3, 4.

From these formed four complex symbols, code matrix former 242 may form two two-by-two code matrices 243, such as the Alamouti code matrices illustrated below:

$$A = \begin{bmatrix} x_1 & x_2 \\ -x_2^* & x_1^* \end{bmatrix},$$

-continued $$B = \begin{bmatrix} x_3 & x_4 \\ -x_4^* & x_3^* \end{bmatrix}.$$

In some embodiments that use four transmit antennas, quasi-orthogonal space-time matrix generator 244 may generate a four-by-four quasi-orthogonal space-time matrix (Q) 246 from the two Alamouti code matrices. Quasi-orthogonal space-time matrix 246 may be illustrated as follows:

$$Q_4(x_1, x_2, x_3, x_4) = \begin{bmatrix} A & B \\ B & A \end{bmatrix}.$$

In these embodiments, each row of quasi-orthogonal space-time matrix 246 may be used for generating the time-domain signals for one of the transmit antennas, although the scope of the invention is not limited in this respect. In some alternate embodiments, each column of quasi-orthogonal space-time matrix 246 may be used for generating the time-domain signals for one of transmit antennas. In some embodiments, selection circuitry 250 may select the sequence of space-time encoded symbols represented by one dimension (e.g., a row) of quasi-orthogonal space-time matrix 246 for further processing before transmission.

Linear transformation matrix 261, used by linear transform circuitry 230 discussed above, may be defined as a four-by-four real matrix U. In some embodiments, linear transformation matrix generator 260 may generate one or more linear transform matrices based on the following equations:

$$\varepsilon_1 = \frac{4N_1^2 - 1}{2(2N_1^2 + 2N_2^2 - 1)},$$

$$\varepsilon_2 = \frac{4N_2^2 - 1}{2(2N_1^2 + 2N_2^2 - 1)},$$

$$\alpha = \arctan(2),$$

$$\rho = \sqrt{\frac{5}{12(1 + \varepsilon_1 \varepsilon_2)}}$$

and $$R_1 = \begin{bmatrix} \cos(\alpha) & \sin(\alpha) \\ \sin(\alpha) & -\cos(\alpha) \end{bmatrix},$$

$$P = \begin{bmatrix} 0 & 1 \\ 1 & 0 \end{bmatrix},$$

$$\Sigma = \begin{bmatrix} 1 + \varepsilon_1 & 1 - 2\varepsilon_1 \\ 1 - 2\varepsilon_1 & 2 - \varepsilon_1 \end{bmatrix}.$$

In these equations, N1 and N2 correspond to the integers used by constellation set generator 210. A diagonalization of a symmetric matrix $\Sigma$ may be denoted as:

$\Sigma = V^T DV$, where $D = \text{diag}(\lambda_1, \lambda_2)$, $\epsilon_1$ and $\epsilon_2$ are the eigenvalues of $\Sigma$ and V is a two-by-two orthogonal matrix.

In these embodiments, $$W_1 = \rho V^T \begin{bmatrix} \sqrt{\lambda_1} & 0 \\ 0 & \sqrt{\lambda_2} \end{bmatrix} V,$$

$$W_2 = \rho V^T \begin{bmatrix} \sqrt{\lambda_2} & 0 \\ 0 & \sqrt{\lambda_1} \end{bmatrix} VP,$$

$$R_2 = -PR_1P.$$

Linear transformation matrix U may be selected from one of the following three matrices $U_i$, i=1, 2, 3:

$$U_1 = \begin{bmatrix} W_1 & W_2 \\ W_1 R_1 & W_2 R_2 \end{bmatrix},$$

$$U_2 = U_1 P_2,$$

$$U_3 = U_1 P_3,$$

in which P2 and P3 are permutation matrices that may be defined as follows:

$$P_2 = \begin{bmatrix} 1 & 0 & 0 & 0 \\ 0 & 0 & 1 & 0 \\ 0 & 1 & 0 & 0 \\ 0 & 0 & 0 & 1 \end{bmatrix},$$

$$P_3 = \begin{bmatrix} 1 & 0 & 0 & 0 \\ 0 & 0 & 0 & 1 \\ 0 & 0 & 1 & 0 \\ 0 & 1 & 0 & 0 \end{bmatrix}.$$

In these embodiments, the use of one of linear transform matrices $U_1$, $U_2$ and $U_3$ may help achieve an increased and/or optimal diversity product (i.e., an increased determinant distance and/or coding advantage/gain) of quasi-orthogonal space-time block codes with the minimum maximum-likelihood (ML) decoding.

In some embodiments, when constellation set 211 is a square QAM matrix (i.e., N1=N2), linear transformation matrix $U_1$ becomes orthogonal and of the form:

$$U_1 = \frac{1}{\sqrt{2}} \begin{bmatrix} I_2 & I_2 \\ R_1 & -R_1 \end{bmatrix},$$

In these situations, the linear transform performed by linear transform circuitry 230 may also be orthogonal.

Figure 3:
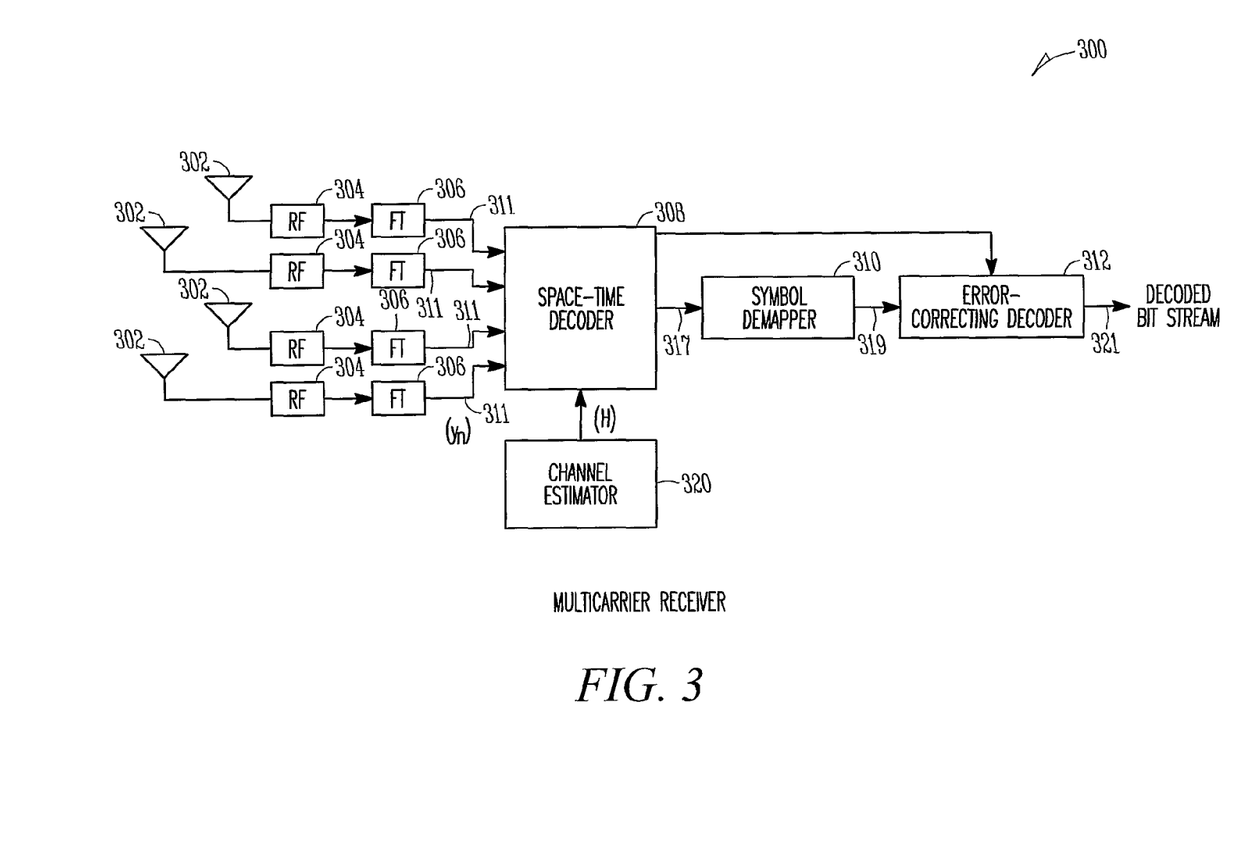
FIG. 3 is a functional block diagram of a multicarrier receiver in accordance with some embodiments of the present invention.

FIG. 3 is a functional block diagram of a multicarrier receiver in accordance with some embodiments of the present invention. Multicarrier receiver 300 may include receive antennas 302 to receive multicarrier communication signals from a multicarrier transmitter, such as multicarrier transmitter 100 (FIG. 1). The number of receive antennas 302 used by multicarrier receiver 300 may be at least as great as the number of transmit antennas 114 (FIG. 1) used by multicarrier transmitter 100 (FIG. 1). Multicarrier receiver 300 may also include RF circuitry 304 for each receive antenna 302 to downconvert the received signals and generate digital baseband signals. Multicarrier receiver 300 may also include Fourier-transform (FT) circuitry 306 for each receive antenna 302 to perform a discrete Fourier transform (DFT), such as an fast Fourier transform (FFT) on signals provided by RF circuitry 304 and to generate frequency-domain signals. In some embodiments, a frequency-domain signal may be generated for each subcarrier of the multicarrier communication signals received by multicarrier receiver 300. Multicarrier receiver 300 may also include space-time decoder 308 to decode the frequency domain signals provided by FT circuitry 306 and generate decision metrics, such as decoded soft bits 315, and decoded symbols represented as hard bits 317, discussed in more detail below. Soft bits 315 may represent a probability associated with a corresponding one of hard bits 317, which may be used by error-correcting decoder 312, discussed below, to accurately generate the bits of decoded bit stream 321.

Multicarrier receiver 300 may also include channel estimator 320 to generate channel estimates (H) for use by space-time decoder 308, among other things. In some embodiments, the outputs of space-time decoder 308 include a pair of symbols for each subcarrier that represent a QAM constellation point, although the scope of the invention is not limited in this respect. Multicarrier receiver 300 may also include symbol demapper 310 to demap hard bits 317 to generate groups of bits. Multicarrier receiver 300 may also include error-correcting decoder 312 to decode the groups of bits generated by symbol mapper 310 to generate decoded bit stream 321. Multicarrier receiver 300 may also include other functional elements not specifically illustrated for ease of understanding.

In some embodiments, the channel estimation performed by channel estimator 320 may be based on OFDM training symbols (i.e., the preambles). In these embodiments, the channel estimates generated from preambles may be used for processing OFDM symbols in a subsequent transmission burst, although the scope of the invention is not limited in this respect.

In some embodiments, error-correcting decoder 312 may be a forward error-correcting (FEC) decoder, such as a turbo decoder, and may decode encoded bits 319 using soft bits 315. In some embodiments, error-correcting decoder 312 may employ convolutional decoding or Reed-Solomon decoding, or a combination thereof, although the scope of the invention is not limited in this respect. In some other embodiments, error-correcting decoder 312 may employ turbo decoding or low-density parity-check (LDPC) decoding, as well as other encoding/decoding techniques using soft bits 315.

In accordance with some embodiments, for each receive antenna 302, space-time decoder 308 may derive objective functions from received signal matrix ($y_n$) 311, may minimize the objective functions to generate hard bits 317, and may solve a set of linear equations of the objective functions to generate soft bits 315. In these embodiments, space-time decoder 308 may perform quasi-orthogonal space-time block decoding for each subcarrier of multicarrier signals received through each of receive antennas 302 using a selected one of the selected linear transformation matrices, such as linear transformation matrix 261 (FIG. 2) (i.e., either $U_1$, $U_2$ or $U_3$). The selected linear transformation matrix may correspond to the linear transformation matrix used by multicarrier transmitter 100 (FIG. 1) for space-time encoding the multicarrier signals for transmission. In some embodiments, space-time decoder 308 may use a channel estimate matrix (H), which may be estimated for a plurality of wireless channels between each of transmit antennas 114 (FIG. 1) of multicarrier transmitter 100 (FIG. 1) and each of receive antennas 302 of multicarrier receiver 300. These embodiments are discussed in more detail below.

Although some embodiments of the present invention are described using at least four receive antennas 302, the scope of the invention is not limited in this respect as other numbers of transmit antennas may also be used. Receive antennas 302 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, instead of two or more antennas, a single antenna with multiple apertures may be used. In these embodiments, each aperture may be considered a separate antenna. In some embodiments, each antenna may be effectively separated to take advantage of spatial diversity and the different channel characteristics that may result between each of receive antennas 302 and another wireless communication device. In some embodiments, receive antennas 302 may be separated by up to $\frac{1}{10}$ of a wavelength or more.

Figure 4:
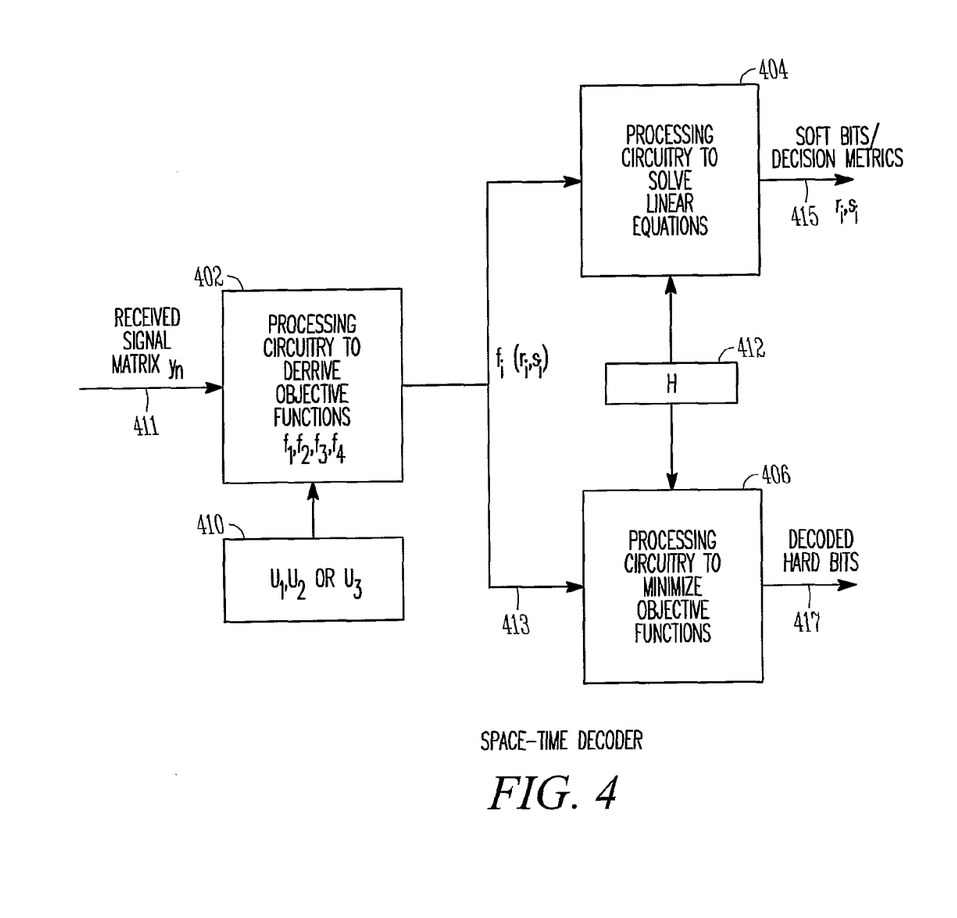
FIG. 4 is a functional diagram of a space-time decoder in accordance with some embodiments of the present invention.

FIG. 4 is a functional diagram of a space-time decoder in accordance with some embodiments of the present invention. Space-time decoder 400 may be suitable for use as space-time decoder 308 (FIG. 3), although other configurations for space-time decoder 308 (FIG. 3) may also be suitable. Space-time decoder 400 includes processing circuitry 402 to derive objective functions, processing circuitry 406 to minimize objective functions, and processing circuitry 404 to solve linear equations. In these embodiments, processing circuitry 402 may derive objective functions 413 from received signal matrix ($y_n$) 411 using one of linear transformation matrices 410. Processing circuitry 406 may minimize objective functions 413 using channel estimate matrix (H) 412 to generate decoded hard bits 417. Processing circuitry 404 may solve a set of linear equations based on objective functions 413 and channel estimate matrix (H) 412 to generate decoded soft bits 415. In some embodiments, space-time decoder 400 may perform these operations for each subcarrier of the received multicarrier signals. In these embodiments, received signal matrix 411 may correspond to one of received signal matrices 311 (FIG. 3) generated for each subcarrier through all receive antennas 302 (FIG. 3) allowing each received signal matrix 411 to include input from each receive antenna 302 (FIG. 3). In these embodiments, decoded soft bits 415 may correspond to soft bits 315 (FIG. 3), and decoded hard bits 417 may correspond to hard bits 317 (FIG. 3). In these embodiments, channel estimate matrix (H) 412 may be generated by channel estimator 320 (FIG. 3), and one of linear transformation matrices 410 may correspond to one of linear transformation matrices 261 (FIG. 2).

In accordance with some embodiments, received signal matrix 411 may be represented by the following equation:

$$Y_n = H_n Q_4(x_{1,n}, x_{2,n}, x_{3,n}, x_{4,n}) + W_n$$

In this equation, $Y_n$ represents the received signal on the $n^{th}$ subcarrier, H represents the channel matrix for the $n^{th}$ subcarrier, Q represents the quasi-orthogonal space-time block code used to encode the signal at the transmitter, x represents the decoded signals and W represents additive channel noise.

By applying one of the linear transform matrices discussed above, and with removal of the subcarrier index n, maximum-likelihood decoding may be accomplished by space-time decoder 400 based on one of the following equations:

$$\left\| Y - HQ_4 \begin{pmatrix} r_1, \ldots, r_4 \\ s_1, \ldots, s_4 \end{pmatrix} \right\| = \begin{cases} \sum_{i=1,2,3,4} f_i(r_i, s_i), & \text{if } U = U_1 \\ \sum_{i=1,2} f_i(r_i, r_{2+i}) + \sum_{i=1,2} f_i(s_i, s_{2+i}), & \text{if } U = U_2 \\ \sum_{i=1,2} f_i(r_i, s_{2+i}) + \sum_{i=1,2} f_i(s_i, r_{2+i}), & \text{if } U = U_3 \end{cases}$$

In these equations, $f_i(r_i, s_i)$ represent objective functions in which $r_i$ and $s_i$ represent soft bits 415. As illustrated in the above equation, the original eight-tuple real variable searching becomes four times a two-tuple real variable searching.

This may have about the same complexity as one complex symbol searching, which is the same complexity of Alamouti coding when transformation matrix $U_1$ is used for U. In these embodiments, the equation above may become:

$$\arg\min_{r_1,\ldots,r_4,s_1,\ldots,s_4}\|Y-HQ_4(r_1,\ldots,r_4,s_1,\ldots,s_4)\| \leftrightarrow \arg\min_{r_i,s_i}f_i(r_i,s_i), i=1,2,3,4,$$

Based on the above, processing circuitry 402 may derive objective functions 413 as follows. In some embodiments, a rotation using $R_1$ and $U_1$ for a square QAM signal constellation discussed above may be performed.

In these embodiments, the channel estimate (H) in a MEMO system may be represented as:

$$H=(h_{n,i})_{1\leq n\leq N, 1\leq i\leq M} \text{ and}$$

the received signal matrix (Y) be represented as:

$$Y=(y_{n,i})_{1\leq n\leq N, 1\leq i\leq T}$$

In these equations, M represents the number of transmit antennas, N represents the number of receive antennas, and T represents the number of time-slots (e.g., T OFDM symbols). In some embodiments that use four transmit antennas (M=4) and four receive antennas (N=4), for four time slots (T=4), the following equations may represent the signals transmitted by four transmit antennas.

$$a_{n,1} = y_{n,1}^* h_{n,1} + y_{n,3}^* h_{n,3} + y_{n,2} h_{n,2}^* + y_{n,4} h_{n,4}^*$$

$$a_{n,2} = y_{n,1}^* h_{n,2} + y_{n,3}^* h_{n,4} - y_{n,2} h_{n,1}^* - y_{n,4} h_{n,3}^*$$

$$a_{n,3} = y_{n,1}^* h_{n,3} + y_{n,3}^* h_{n,1} + y_{n,2} h_{n,4}^* + y_{n,4} h_{n,2}^*$$

$$a_{n,4} = y_{n,1}^* h_{n,4} + y_{n,3}^* h_{n,2} - y_{n,2} h_{n,3}^* - y_{n,4} h_{n,1}^*$$

and $$c = 2\sum_{n=1}^{N} \text{Re}(h_{n,1}h_{n,3}^* + h_{n,2}h_{n,4}^*)$$

$$v_k = \cos(\alpha r_k) + \sin(\alpha s_k) + j(\sin(\alpha r_k) - \cos(\alpha s_k))$$

$$u_k = (r_k^2 - s_k^2)\cos\alpha + 2r_k s_k \sin\alpha$$

By algebraic manipulation, objective functions 413 may be derived by processing circuitry 402 as follows:

$$f_1(r_1,s_1) = \frac{\rho}{4}(\|H\|^2|z_1|^2 + cu_1) - \sqrt{\frac{\rho}{2}}\sum_{n=1}^{N}\text{Re}(a_{n,1}z_1 + a_{n,3}v_1)$$

$$f_2(r_2,s_2) = \frac{\rho}{4}(\|H\|^2|z_2|^2 + cu_2) - \sqrt{\frac{\rho}{2}}\sum_{n=1}^{N}\text{Re}(a_{n,2}z_2 + a_{n,4}v_2)$$

$$f_3(r_3,s_3) = \frac{\rho}{4}(\|H\|^2|z_3|^2 + cu_3) - \sqrt{\frac{\rho}{2}}\sum_{n=1}^{N}\text{Re}(a_{n,1}z_3 - a_{n,3}v_3)$$

$$f_4(r_4,s_4) = \frac{\rho}{4}(\|H\|^2|z_4|^2 + cu_4) - \sqrt{\frac{\rho}{2}}\sum_{n=1}^{N}\text{Re}(a_{n,2}z_4 - a_{n,4}v_4)$$

Processing circuitry 406 may operate on these objective functions to generate decoded hard bits 417, which may represent the output of maximum-likelihood decoding. In some embodiments, processing circuitry 406 may minimize the objective functions using the following equation to generate decoded hard bits 417:

$$\hat{z}_k = \arg\min_{z_k = r_k + js_k \in S} f_k(r_k,s_k), k=1,2,3,4.$$

In these embodiments, $r_k$ and $r_s$ represent decoded hard bits 417 corresponding to the symbols that were transmitted on the four transmit antennas.

Processing circuitry 404, on the other hand, may generate soft bits 415 from maximum-likelihood decoding by minimizing objective functions 413 (e.g., the four objective functions represented as $f_i(r_i, s_i)$ shown above) in terms of real values $r_i$ and $s_i$ over the real line instead of over constellation set S, which may be a discrete signal constellation set. Since the objective functions $f_i(r_i, s_i)$ are quadratic forms of the real variables $r_i$ and $s_i$, the minimum and the soft output of the maximum-likelihood decoding may be determined by processing circuitry 404 by solving the following two-by-two linear equations:

$$\sqrt{\frac{\rho}{2}}\begin{bmatrix} \|H\|^2 + c\cos\alpha & c\sin\alpha \\ c\sin\alpha & \|H\|^2 - c\cos\alpha \end{bmatrix}\begin{bmatrix} \hat{r}_1 \\ \hat{s}_1 \end{bmatrix} =$$

$$\sum_{n=1}^{N}\begin{bmatrix} \text{Re}(a_{n,1}) + \text{Re}(a_{n,3})\cos\alpha - \text{Im}(a_{n,3})\sin\alpha \\ -\text{Im}(a_{n,1}) + \text{Re}(a_{n,3})\sin\alpha + \text{Im}(a_{n,3})\cos\alpha \end{bmatrix}$$

$$\sqrt{\frac{\rho}{2}}\begin{bmatrix} \|H\|^2 + c\cos\alpha & c\sin\alpha \\ c\sin\alpha & \|H\|^2 - c\cos\alpha \end{bmatrix}\begin{bmatrix} \hat{r}_2 \\ \hat{s}_2 \end{bmatrix} =$$

$$\sum_{n=1}^{N}\begin{bmatrix} \text{Re}(a_{n,2}) + \text{Re}(a_{n,4})\cos\alpha - \text{Im}(a_{n,4})\sin\alpha \\ -\text{Im}(a_{n,2}) + \text{Re}(a_{n,4})\sin\alpha + \text{Im}(a_{n,4})\cos\alpha \end{bmatrix}$$

$$\sqrt{\frac{\rho}{2}}\begin{bmatrix} \|H\|^2 + c\cos\alpha & -c\sin\alpha \\ -c\sin\alpha & \|H\|^2 + c\cos\alpha \end{bmatrix}\begin{bmatrix} \hat{r}_3 \\ \hat{s}_3 \end{bmatrix} =$$

$$\sum_{n=1}^{N}\begin{bmatrix} \text{Re}(a_{n,1}) - \text{Re}(a_{n,3})\cos\alpha + \text{Im}(a_{n,3})\sin\alpha \\ -\text{Im}(a_{n,1}) - \text{Re}(a_{n,3})\sin\alpha - \text{Im}(a_{n,3})\cos\alpha \end{bmatrix}$$

$$\sqrt{\frac{\rho}{2}}\begin{bmatrix} \|H\|^2 - c\cos\alpha & -c\sin\alpha \\ -c\sin\alpha & \|H\|^2 + c\cos\alpha \end{bmatrix}\begin{bmatrix} \hat{r}_4 \\ \hat{s}_4 \end{bmatrix} =$$

$$\sum_{n=1}^{N}\begin{bmatrix} \text{Re}(a_{n,2}) - \text{Re}(a_{n,4})\cos\alpha + \text{Im}(a_{n,4})\sin\alpha \\ -\text{Im}(a_{n,2}) - \text{Re}(a_{n,4})\sin\alpha - \text{Im}(a_{n,4})\cos\alpha \end{bmatrix}$$

Decoded soft bits 415 resulting from solving these equations may be used by an error-correcting decoder, such as error-correcting decoder 312 (FIG. 3). In some embodiments, the solutions to the above two-by-two linear equations may be enhanced by using minimum mean square estimation (MMSE), although the scope of the invention is not limited in this respect.

In some the embodiments described above, coding gain may be maximized in space-time coding for MIMO OFDM systems with four transmit antennas with fast maximum-likelihood decoding with about the same complexity as Alamouti decoding.

Referring to FIGS. 1-4, although multicarrier transmitter 100, space-time encoder 200, multicarrier receiver 300 and space-time decoder 400 are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements illustrated may refer to one or more processes operating on one or more processing elements.

In some embodiments, multicarrier transmitter 100 and/or multicarrier receiver 300 may be part of one or more wireless communication devices that may communicate OFDM communication signals over a multicarrier communication channel. The multicarrier communication channel may be within a predetermined frequency spectrum and may comprise a plurality of orthogonal subcarriers. In some embodiments, the multicarrier signals may be defined by closely spaced OFDM subcarriers. Each subcarrier may have a null at substantially a center frequency of the other subcarriers and/or each subcarrier may have an integer number of cycles within a symbol period, although the scope of the invention is not limited in this respect. In some embodiments, multicarrier transmitter 100 and/or multicarrier receiver 300 may communicate in accordance with a multiple access technique, such as orthogonal frequency division multiple access (OFDMA), although the scope of the invention is not limited in this respect.

In some embodiments, multicarrier transmitter 100 and/or multicarrier receiver 300 may be part of a communication station, such as wireless local area network (WLAN) communication station including a Wireless Fidelity (WiFi) communication station, an access point (AP) or a mobile station (MS). In some other embodiments, multicarrier transmitter 100 and/or multicarrier receiver 300 may be part of a broadband wireless access (BWA) network communication station, such as a Worldwide Interoperability for Microwave Access (WiMax) communication station, although the scope of the invention is not limited in this respect as multicarrier transmitter 100 and/or multicarrier receiver 300 may be part of almost any wireless communication device.

In some embodiments, multicarrier transmitter 100 and/or multicarrier receiver 300 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some embodiments, the frequency spectrums for the communication signals received by multicarrier transmitter 100 and/or multicarrier receiver 300 may comprise either a 5 gigahertz (GHz) frequency spectrum or a 2.4 GHz frequency spectrum. In these embodiments, the 5 gigahertz (GHz) frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some BWA network embodiments, the frequency spectrum for the communication signals may comprise frequencies between 2 and 11 GHz, although the scope of the invention is not limited in this respect.

In some embodiments, multicarrier transmitter 100 and/or multicarrier receiver 300 may communicate signals in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for wireless local area networks, although the scope of the invention is not limited in this respect as multicarrier transmitter 100 and/or multicarrier receiver 300 may also be suitable to transmit and/or receive communications in accordance with other techniques and standards.

In some broadband wireless access network embodiments, multicarrier transmitter 100 and/or multicarrier receiver 300 may communicate signals in accordance with the IEEE 802.16-2004 and the IEEE 802.16(e) standards for wireless metropolitan area networks (WMANs) including variations and evolutions thereof, although the scope of the invention is not limited in this respect as multicarrier transmitter 100 and/or multicarrier receiver 300 may also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Some embodiments of the invention may be implemented in one or a combination of hardware, firmware and software. Some embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus, the following claims are hereby incorporated into the detailed description, with each claim standing on its own as a separate preferred embodiment.

What is claimed is:

1. A method for space-time encoding multicarrier signals performed by a multicarrier transceiver, the method comprising:
- linearly transforming input symbols of a constellation set with a selected transformation matrix to generate linearly transformed symbols;
- forming a complex symbol for each of a plurality of transmit antennas from the linearly transformed symbols;
- forming code matrices from the complex symbols; and
- generating a quasi-orthogonal space-time matrix from the code matrices for use in generating multicarrier signals for transmission by the transmit antennas,
- wherein the linearly transforming, the forming of complex symbols, the forming of code matrices and the generating is performed by a space-time encoder of the multicarrier transceiver.

2. The method of claim 1 further comprising processing a sequence of symbols represented by one dimension of the quasi-orthogonal space-time matrix for transmission on a plurality of subcarriers comprising the multicarrier signals, the processing being performed by inverse fast Fourier transform (IFT) circuitry.

3. The method of claim 2 wherein the further processing comprises, for each transmit antenna of the plurality:
- performing an inverse Fourier transform on each of the symbols of the one dimension of the quasi-orthogonal space-time matrix to generate a time-domain waveform; and
- upconverting the time-domain waveform for transmission by an associated one of the transmit antennas,
- wherein each transmit antenna of the plurality concurrently transmits information represented by groups of the symbols of the one dimension of the quasi-orthogonal space-time matrix.

4. The method of claim 2 wherein generating the code matrices comprises generating Alamouti code matrices from the linearly transformed symbols, and
- wherein the quasi-orthogonal space-time matrix comprises a matrix of the Alamouti code matrices.

5. The method of claim 1 further comprising:
- generating a quadrature amplitude modulation constellation set from an initial bit stream; and
- mapping bits of the constellation set to a plurality of complex symbols,
- wherein the generating a quadrature amplitude modulation constellation set and the mapping of bits of the constellation set are performed by the space-time encoder, and
- wherein the linearly transforming comprises linearly transforming the plurality of mapped complex symbols using the selected transformation matrix to generate a plurality of real symbols.

6. A space-time encoder comprising:
- linear transform circuitry to linearly transform input symbols of a constellation set with a selected transformation matrix to generate linearly transformed symbols;
- a complex symbol former to form a complex symbol for each of a plurality of transmit antennas from the linearly transformed symbols;
- a code matrix former to form code matrices from the complex symbols; and
- a quasi-orthogonal space-time matrix generator to generate a quasi-orthogonal space-time matrix from the code matrices for use in generating multicarrier signals for transmission by the transmit antennas.

7. The space-time encoder of claim 6 wherein a sequence of symbols represented by one dimension of the quasi-orthogonal space-time matrix is processed by inverse fast Fourier transform (IFT) circuitry for transmission on a plurality of subcarriers comprising the multicarrier signals.

8. The space-time encoder of claim 7 wherein for each transmit antenna of the plurality, an inverse Fourier transform is performed on each of the symbols of the one dimension of the quasi-orthogonal space-time matrix to generate a time-domain waveform,
- wherein the time-domain waveform is upconverted for transmission by an associated one of the transmit antennas, and
- wherein each transmit antenna of the plurality concurrently transmits information represented by groups of the symbols of the one dimension of the quasi-orthogonal space-time matrix.

9. The space-time encoder of claim 7 wherein the code matrix former generates Alamouti code matrices from the linearly transformed symbols, and
- wherein the quasi-orthogonal space-time matrix generator generates the quasi-orthogonal space-time matrix comprising a matrix of the Alamouti code matrices.

10. The space-time encoder of claim 6 further comprising:
- a constellation set generator to generate the constellation set from an initial bit stream; and
- a symbol mapper to map bits of the constellation set to a plurality of complex symbols corresponding to a number of the transmit antennas,
- wherein the constellation set comprises a quadrature amplitude modulation constellation set, and
- wherein the linear transform circuitry linearly transforms the plurality of mapped complex symbols using the selected transformation matrix to generate a plurality of real symbols.

11. A multicarrier receiver comprising:
- Fourier transform circuitry to generate a received signal matrix for each subcarrier from received multicarrier signals;
- a space-time decoder to generate decoded soft bits and decoded hard bits from the received signal matrices;
- a symbol demapper; and
- an error correcting decoder,
- wherein the space-time decoder comprises processing circuitry to:
- derive objective functions from the received signal matrix, the objective functions being functions of decoded hard bits;
- operate on the objective functions to determine the decoded hard bits,
- generate a set of linear equations from the objective functions; and
- solve the set of linear equations using the decoded hard bits to generate decoded soft bits, each soft bit representing a probability associated with a corresponding one of the hard bits,
- wherein the symbol demapper is to demap the decoded hard bits to generate demapped blocks of bits, and
- wherein the error correcting decoded is to perform error-correcting decoding operations on the demapped blocks of bits using the decoded soft bits to generate a decoded bit stream.

12. The multicarrier receiver of claim 11 wherein the processing circuitry:
- performs quasi-orthogonal space-time block decoding for each subcarrier of multicarrier signals received through a plurality of antennas coupled to a multicarrier receiver; and
- uses a selected one of a plurality of transform matrices, wherein the selected transformation matrix corresponds to a transformation matrix used by a multicarrier transmitter for space-time encoding the multicarrier signals for transmission to the multicarrier receiver.

13. The multicarrier receiver of claim 12 wherein the processing circuitry uses a channel estimate matrix estimated for a plurality of wireless channels between the multicarrier transmitter and the multicarrier receiver to minimize the objective functions solve the set of linear equations.

* * * * *

UNITED STATES PATENT AND TRADEMARK OFFICE
CERTIFICATE OF CORRECTION

| | |
|---|---|
| PATENT NO. | : 8,457,231 B2 |
| APPLICATION NO. | : 12/447026 |
| DATED | : June 4, 2013 |
| INVENTOR(S) | : Zhu et al. |

It is certified that error appears in the above-identified patent and that said Letters Patent is hereby corrected as shown below:

On the Title Page, Item (56)

On page 2, in column 1, under "Other Publications", line 6, after "complexity"", insert --,--, therefor

On page 2, in column 2, under "Other Publications", line 4, delete "dated" and insert --mailed--, therefor In the Claims In column 13, line 22, in Claim 2, after "inverse", delete "fast", therefor In column 14, line 1, in Claim 7, after "inverse", delete "fast", therefor Signed and Sealed this
Twenty-third Day of December, 2014

Michelle K. Lee
*Deputy Director of the United States Patent and Trademark Office*